United States Patent [19]

Schulz

[11] Patent Number: 4,690,232

[45] Date of Patent: Sep. 1, 1987

[54] HOLD DOWN APPARATUS FOR THE TIPPABLE STRUCTURE OF A VEHICLE

[75] Inventor: Gerd Schulz, Hamburg, Fed. Rep. of Germany

[73] Assignee: Gerd Schulz Fahrzeug- und Container-Technik, Hamburg, Fed. Rep. of Germany

[21] Appl. No.: 805,883

[22] Filed: Dec. 6, 1985

[30] Foreign Application Priority Data

Dec. 8, 1984 [DE] Fed. Rep. of Germany ....... 3444804

[51] Int. Cl.[4] .............................................. B62D 33/06

[52] U.S. Cl. .............................. 180/89.14; 180/89.18; 292/78

[58] Field of Search ............... 180/89.15, 89.14, 89.13, 180/89.16, 89.17, 89.18, 89.19; 292/78

[56] References Cited

U.S. PATENT DOCUMENTS

| | | | |
|---|---|---|---|
| 2,833,578 | 5/1958 | Burke | 292/78 X |
| 3,105,266 | 10/1963 | Flaith et al. | 292/78 X |
| 3,122,796 | 3/1964 | Woolley | 292/78 X |
| 3,492,038 | 1/1970 | Schlage et al. | 292/78 |
| 3,506,292 | 4/1970 | Hagendoorn et al. | 292/78 |
| 3,713,681 | 1/1973 | Worley | 292/78 |
| 3,823,976 | 7/1974 | McMillen | 180/89.14 X |

FOREIGN PATENT DOCUMENTS

| | | | |
|---|---|---|---|
| 130646 | 4/1978 | Fed. Rep. of Germany | 180/89.14 |
| 488391 | 1/1976 | U.S.S.R. | 180/89.14 |

*Primary Examiner*—John J. Love
*Assistant Examiner*—Charles R. Watts
*Attorney, Agent, or Firm*—Wood, Herron & Evans

[57] ABSTRACT

A hold down apparatus for a tippable structure of a vehicle has a clamping catch which is rotatable about a transverse axis. The catch has a fork formed by two projecting prongs on one side of the transverse axis and, on the other side of the transverse axis, is acted upon by a spring device which holds the clamping catch with an over-center action either against a stop, in which position the opening of the fork faces the structure, or urges the clamping catch with spring action into a second position in which the fork is held in an essentially horizontal position in which the structure is clamped down.

11 Claims, 2 Drawing Figures

HOLD DOWN APPARATUS FOR THE TIPPABLE STRUCTURE OF A VEHICLE

BACKGROUND OF THE INVENTION

I. Field of the Invention

The invention provides a hold down apparatus for a tippable structure of a vehicle having a locking element on the tippable structure and spring loaded lever arrangement which is pivotable relative to the locking element and spring between a released position and a hold down position.

II. Description of the Prior Art

Tippable structures provided on vehicles are generally tiltable around a rear horizontal axis with the help of a hydraulic cylinder which acts on the forward end of the tippable structure. There are also tippable structures which alternatively or additionally can be pivoted about a longitudinal side axis.

There is a problem associated with such structures, namely that—particularly in the empty condition—they are prone to jump around. The resulting noise and wear are understandably undesired.

To overcome these difficulties it is known to hold the structure in its lower position by means of a hold down apparatus.

One such hold down apparatus has a rubber block secured to the vehicle frame by means of a bowl-like housing and a bolt. The rubber block has a central hole which can grip a spherical stud fixed to the tippable structure. The recess in the rubber block is, if necessary, spherical so that the rubber grips around the cylindrical stud and fixes it in position. The problem with this is that, through general wear and upon bending of the spherical stud, its position changes in the course of time and thus it is not held securely in the recess in the rubber block but rather progressively destroys it.

Another known apparatus functions with a hook on the tippable structure, a double lever fixed to the vehicle and a clamping lever impinging on these, which clamping lever is biased into a locking position by a tension spring. A shock absorber is arranged parallel to the spring which rigidly braces the spring when receiving short shocks. This apparatus works as follows. As the tippable structure is lowered the hook descends and twists the double lever from its released position, and in fact into a recess in the hook. The clamping lever then presses the double lever under the action of spring into the locking position and holds it there. The disadvantage of this construction is firstly its large vertical mounting height which prevents it from being used for a riding type vehicle. Furthermore, in this apparatus there is the danger that the interengaging parts will not be in their proper places as the hook descends as a result of wear and misalignment over the course of time, so in this case as well destruction is a possible concern. Even without wear caused by age, difficulties with coupling appear in particular if the vehicle stands on uneven ground and the vehicle frame as well as the tippable structure are bent or twisted in different directions. A further disadvantage of this apparatus is the production costs arising from the required number of constituent parts and the precise manner in which they have to be assembled.

SUMMARY OF THE INVENTION

The object of the invention is the production of a hold down apparatus which can be produced at relatively low cost, which has a small mounting height and in particular requires only a small number of parts which are not prone to wear.

This object is achieved, according to the present invention, by a hold down apparatus of the type referred to in the introduction in which the locking element is formed as a locking bolt and the lever arrangement is formed as a clamping catch having a fork-like member, which catch is pivotable between two positions about a transverse axis which is approximately parallel to the locking bolt, in one of which positions the fork opening faces towards the locking bolt and in the other of which positions a prong of the fork lies in the path of the locking bolt; in which the spring is a compression spring which is pivotally attached at one end to the clamping catch on one side of the transverse axis opposite to the fork-like member and at its other end is connected to the vehicle body; and in which the line of action of the compression spring upon rotation of the clamping catch moves through the plane interconnecting the transverse axis and the compression spring attachment axis (bolt).

The following advantageous arrangements and further developments of the solution are preferred either when used alone or in various combinations.

To define the released position of the clamping catch, a stop may be provided on the vehicle body and the pivot point of the spring on the clamping catch is provided in such a location that it lies on one side of the stated plane when the clamping catch rests against the stop and it lies on the other side of the plane when the clamping catch is in the released position.

Further, the stop may be formed by a plate which extends parallel to the transverse axis between two plates of a positioning lug which supports the clamping catch or that the stop is formed on a base plate which carries the clamping catch and the spring and against which base plate the outer surface of the spring lies when the clamping catch is in the released position.

Preferably, the angle of rotation of the clamping catch between its released position and its hold down position is about 45°.

It is also preferred that the spacing between the prongs of the fork-like member on the clamping catch over their entire length is larger than the diameter of the locking bolt.

The prongs forming the fork of the clamping catch may be of different lengths to further reduce the difficulties of guiding the locking bolt into the fork of the clamping catch and the prong adjacent to the base plate when the clamping catch is in the hold down position is longer than the other prong, and the locking bolt may have an axial length which exceeds by at least double the width of the clamping catch in the region of the fork thereon.

In one embodiment it is preferred that the end of the spring remote from the clamping catch is provided with a bushing having an axis parallel to the transverse axis, which bushing encircles a bolt which is held in a positioning lug fixed to the vehicle body.

Alternatively, however, in order to reduce manufacturing costs, the end of the spring remote from the clamping catch may be provided with a bifurcated element which is supported on a bolt having an axis parallel to the transverse axis which in turn is supported in a positioning lug fixed to the vehicle body.

In a preferred form, the spring is a hollow rubber spring or the like which extends between two plates of adjustable separation; one of the plates is pivotally attached to the clamping catch via a projection therefrom and a transverse bolt and this plate is also provided with a projecting tube which extends into the interior of the hollow rubber spring. The tube telescopically receives a rod which is at least partially provided with a thread, which rod extends through a central hole in the other plate and its end located outside the hollow rubber spring or the like is attached to the bushing/bifurcated element and the rod carries a nut in contact with the side of the plate remote from the hollow rubber spring or the like, the nut forming an adjustable stop for the plate.

The basis of the solution provided by the invention consists of the use of a clamping catch which is pivoted about an axis fixed to the vehicle body, which clamping catch has a fork-like element on one side of the axis formed by two prongs, and an adjustable compression spring attached at the other side of the axis and having at least one over-centre position which, in view of its arrangement, forms a rearward extension of the recess in the clamping catch. By this means, not only can a low mounting height be achieved, but also the number of elements subject to wear is minimized compared with previous devices of the same type. Further, the danger of the apparatus breaking is less than with prior art devices because the cooperating parts of the vehicle and tippable structure need be less exactly aligned than has previously been the case. Particularly advantageous is the large extent of automatic adjustment of the apparatus in its hold down position resulting from the action of the spring.

It should be mentioned that a vehicle can be provided if desired with more than one such hold down apparatus.

DESCRIPTION OF THE DRAWINGS

The invention is described in further detail in the following with reference to the preferred embodiment shown in the drawings. In the drawings.

DETAILED DESCRIPTION OF A PREFERRED EMBODIMENT

Figure 1:
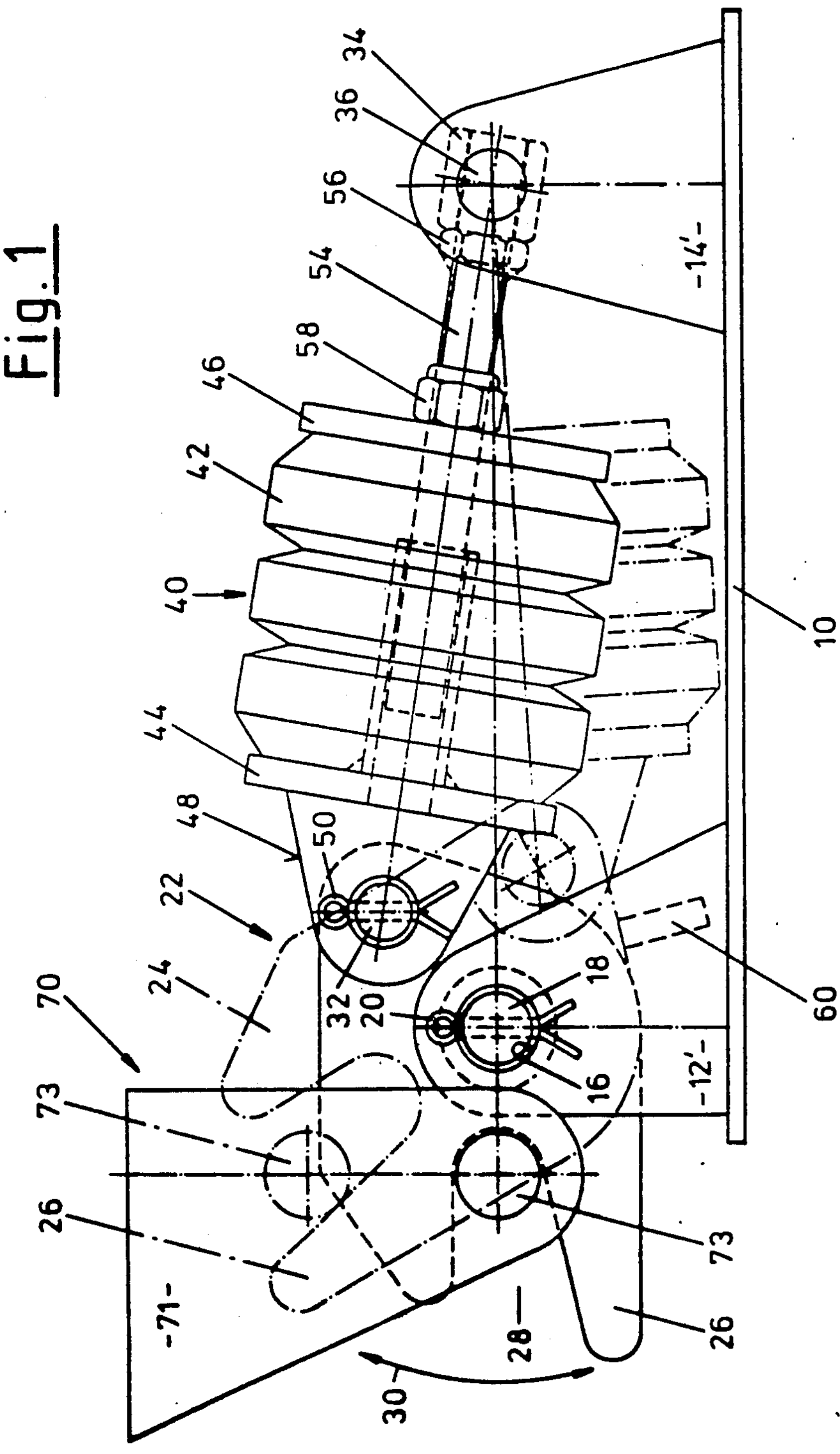
FIG. 1 is a side view of a hold down apparatus.

Two positioning lugs 12,14 are fixed adjacent to opposite ends of a base plate 10, which serves to connect the apparatus with a vehicle. Each positioning lug consists of two parallel spaced plates 12',12" or 14',14". The positioning lug 12 has a transverse bore 16 which passes through both plates 12',12". A bolt 18 is held with some free play in this transverse bore, which in this embodiment is fixed against movement in the axial direction with the help of split pins 20.

A clamping catch 22 is rotatably positioned on the bolt 18 and is fixed against sideways motion by the two plates 12',12". The clamping catch 22 has two prongs 24,26 which define between themselves a channel 28. According to the pivoted position of the clamping catch 22, the prongs 24,26 either point upwards, i.e. away from the base plate 10, or to the left (in FIG. 1), i.e., in the direction facing away from the other positioning lug 14. The clamping catch 22 is shown in two positions in FIG. 1. The representation shown in solid lines corresponds to the hold down position, from which the clamping catch is rotatable in the direction of the arrow 30 to a released position as shown in dot-dash lines. As shown in the drawings, in the clamping position, the lower one 26 of the two prongs projects further from the bolt 18 than the other prong 24. The reason for this difference is explained below.

The clamping catch 22 is penetrated by a bolt 32 at a position on the other side of the bolt 18 from the channel 28. As shown in FIG. 1, the spacing of the bolt 32 from the plate 10 in the hold down position of the clamping catch 22 is greater than the corresponding spacing of the bolt 18. The clamping catch 22 is configured in such a way as to make these spacings possible, as can be seen from the drawings. The height of the bolt 32 above the plate 10 relative to the height of the bolt 18 is usually chosen so that, when the clamping catch is rotated to its released position (shown in dot-dash lines), the bolt 32 has a smaller spacing from the base plate 10 than the other bolt 18. The reason for this proportional relationship is to achieve an over-centre journalling of the clamping catch 22.

The bolt 32 rotatably connects the end of a spring device 40 to the clamping catch 22. The other free end of the spring device is supported on a bolt 36 by means of a bushing 34 (FIG. 1) or a bifurcated member 35 (FIG. 2), the bolt 36 having its axis held parallel to the other bolts 18,32 between the two plates 14',14" of the positioning lug 14. This further bolt 36 has, in this embodiment, the same spacing from the base plate 10 as the bolt 18 which supports the clamping catch 22. This height of the bolt 36 is in correlation with the top dead centre position of the clamping catch, i.e. therefore related to the spacings of the two other bolts from each other and from the base plate 10.

Figure 2:
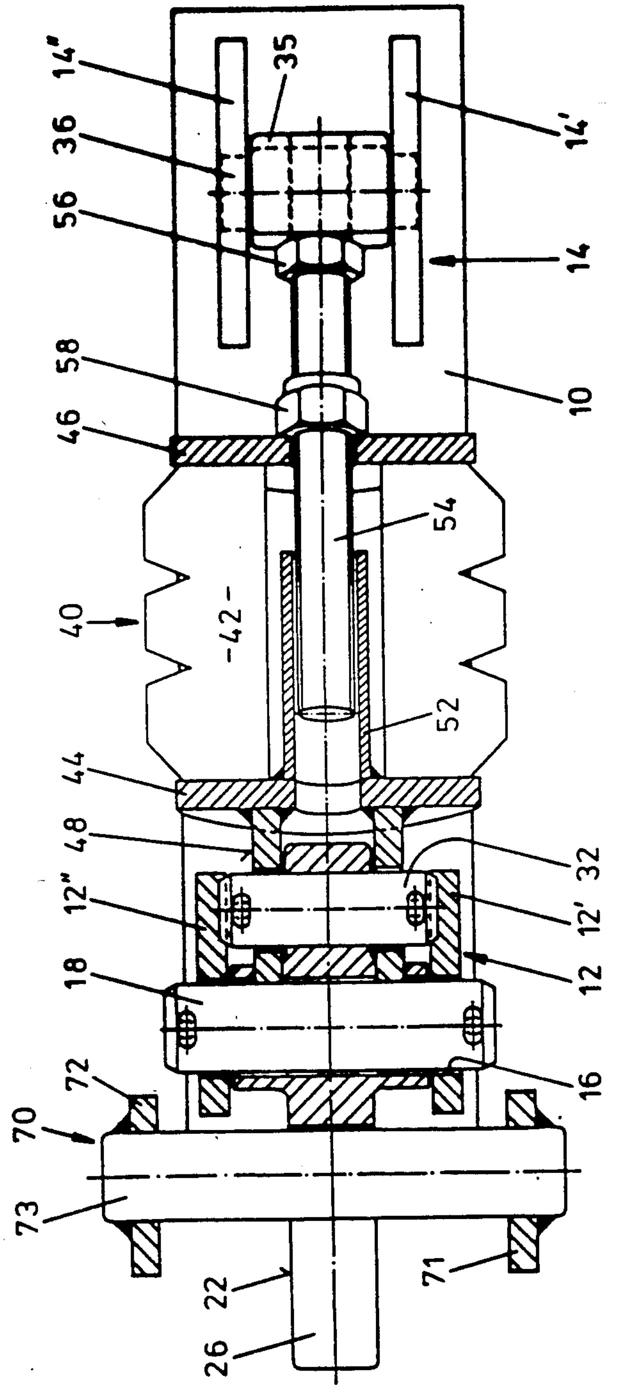
FIG. 2 is a longitudinal cross section through the apparatus taken generally in the horizontal plane.

The spring device 40 is a compression spring having adjustable spring force. In the embodiment shown, it has a hollow rubber spring 42 as the spring element. Such an element is already known and is available with various non-linear spring characteristics. As shown in FIG. 2, the hollow rubber spring 42 extends between two spaced plates 44,46, of which the plate 44 carries a bifurcated projection 48 which is connected to the end of the clamping catch 22 facing the positioning lug 14 and is provided with holes for receiving the bolt 32. This bolt is usually secured with split pins 50 as shown in FIG. 1 and is provided in the holes of the projection 48 with a certain amount of play as can be seen from FIG. 2.

A tube 52 projects from the surface of plate 44 which is opposite to the surface carrying the projection 48, and this tube extends in the direction of the other plate 46 within the hollow interior of the hollow rubber spring 42. This tube 52 serves to axially guide a rod 54 which is threaded at least on a part thereof. One end of this rod is located within the tube 52. The other end of the rod is connected to the bushing 34 or the bifurcated element 35. In the embodiment shown, the rod 54 is screwed into the bushing 34 or the bifurcated element 35 and is secured by a nut 56. Of course, at this location, the connection may be welded or the like to achieve the same result.

As can be seen in particular from FIG. 2, the rod 54 passes through a central hole in the plate 46 with a certain amount of play and carries a stop nut 58 adjacent to fixing nut 56, which nut 58 is screwed onto an external thread of the rod 54. The stop nut 58 on the one hand facilitates the mounting of the spring device 40 and on the other hand makes it possible to adjust the spring force, which will be clear from the following description.

If the stop nut 58 is twisted in the direction of the fixing nut 56 when in the disassembled condition of the spring device 40, the rod 54 can be inserted deep into tube 52 without for the time being exerting a force on the hollow rubber spring 42. The result of this is that the axial distance of the bushing 34/bifurcated element 35 from the hole in the projection 48 is quite small despite the intervening spring. In this pre-assembly condition, the spring device 40 can be easily assembled on the two bolts 32 and 36. If the stop nut is now tightened, this pushes the plate 46 in the direction of the fixed plate 44 so that the hollow rubber spring 42 is compressed and tensioned. The play mentioned above between the various holes and bolts is unimportant after the generation of the spring tension. However, it contributes to a considerable saving of costs during production.

From a consideration of FIG. 1 it will be apparent that the spring device 40 presses the clamping catch 22 against a stop 60 located between plates 12′,12″ when the catch is in the released position shown in dot-dash lines, in which position the fork-like element formed by the prongs 24,26 and the intervening channel 28 is rotated upwardly, i.e. away from the ground plate, through an angle of about 45°.

The hold down structure of a vehicle provided with the apparatus described above has a chock 70 on its underside which consists of spaced plates 71,72 between which a locking bolt 73 is welded or the like. The axis of this bolt extends essentially parallel to the axis of the bolt 18. However, this parallel relationship is not particularly necessary. It should be mentioned at this point that the choice of the length of the latch bolt 73 is practically unlimited and for example a length which accommodates several co-operating units according to FIG. 2 can be provided, so that the spacing between the plates 71,72 of the chock 70—and therefore the length of the locking bolt 73—may be considerably larger than the thickness of the clamping catch 22 in the region of the prongs. Furthermore, since the prong 26 extends by a considerable distance beyond the locking bolt 73, its dimension in the longitudinal direction of the apparatus is also not particularly critical.

When the tippable structure (not shown) with its chock 70 is lowered, the latch bolt 73 moves into the upward facing channel 28 of the clamping catch to a small extent and contacts the inner surface of the prong 26. A furtherance of the movement leads to the prong 26 being forced downwardly by the locking bolt 73, which causes the clamping catch 22 to move in the opposite direction to arrow 30 away from the stop 60. As soon as the axis of the bolt 32 passes, as a result of this movement, through the plane connecting the bolt axes of the positioning lugs 12,14, the spring device 40 additionally forces the clamping catch 22 into the locking position, whereby the construction is, as a result of the force of the spring device 40, pulled against a stop (not shown) which is fixed to the vehicle body and the tippable structure is thus clamped down. All constituent elements of the apparatus are now subject to the force of the spring device 40, so that rattling motion of the tippable structure is not possible.

If the structure is raised by its hydraulic cylinder or the like for the commencement of a tipping operation, this must first overcome the bias of the spring device 40. Thereupon the latch bolt 73 presses against the prong 24 of the clamping catch and rotates this in a clockwise direction. After the axis of the bolt 32 has passed through the plane containing the axes of the bolts 18,36, the clamping catch swings under the effect of the spring device 40 to its released position against stop 60. From the above it will be seen that the basis of the hold down device lies in the use of a fork-like clamping catch 22 which is biased by compression spring 40,42, and is rotatable around a bolt 18, whereby the compression spring device 40 acts on the clamping catch on one side of the bolt and the fork formed by the prongs 24,26 is located on the other side of the bolt 18.

I claim:

1. A hold down apparatus for a vehicle of the type having a vehicle body and a tippable structure pivotally mounted on said vehicle body, said tippable structure having a locking bolt thereon, and said hold down apparatus being adapted to cooperate with said locking bolt to hold said tippable structure in a desired position on said vehicle body, the improvement in said hold down apparatus comprising a clamping catch mountable on said vehicle body, said clamping catch being pivotable about a transverse axis, said clamping catch having a fork-like member formed by a pair of spaced prongs lying on one side of said transverse axis, and a spring device having an adjustable spring force, said spring device being pivotally connected to said clamping catch on the other side of said transverse axis, said spring device having a compression spring which is pivotally connectable to said vehicle body at that end of said spring device remote from said clamping catch, said clamping catch being pivotable about said transverse axis between a release position in which said fork-like member is positioned to face said tippable structure for receiving said locking bolt therein and a hold down position in which said locking bolt is captured within said fork-like member by prongs for preventing movement of said locking bolt, said spring device comprising a hollow rubber compression spring captured between two mounting plates, said mounting plates having adjustable relative spacing therebetween, a projection fixed to one side of one of said mounting plates, said projection being pivotally attached to said clamping catch, a tubular projection fixed to the other side of said one of said mounting plates, said tubular projection extending within said hollow rubber spring, a central hole defined in the other of said mounting plates, a partially threaded rod that extends through said central hole, one end of said bolt being telescopically received within said tubular projection and the other end of said bolt being pivotally attachable to said vehicle body, and a nut threaded on said rod, said nut bearing against an outer surface of said other mounting plate for forming an adjustable stop for said other plate, and an over center connector that connects said spring device and said clamping catch such that said clamping catch has an over-centre action when said clamping catch is moved between said release and hold down positions.

2. An improvement as set forth in claim 1, said improvement further comprising a stop mountable on said vehicle body to prevent said clamping catch from rotating beyond its preferred release position.

3. An improvement as set forth in claim 2, said improvement further comprising two spaced plates that define a positioning lug by which said clamping catch is mountable on said vehicle body, said stop extending between said two spaced plates, and said stop being parallel to said transverse axis.

4. An improvement as set forth in claim 2, said improvement further comprising a base plate on which said clamping catch and spring devide are mounted, said base plate being mountable to said vehicle body.

5. An improvement as set forth in claim 1, said clamping catch being adapted to pivot through an angle of about 45° when moving between said hold down position and said release position.

6. An improvement as set forth in claim 1, the spacing between said prongs being wider than the diameter of said locking bolt on said tippable structure.

7. An improvement as set forth in claim 1, said prongs being of a shorter length and a longer length, that prong located closest to said vehicle body when the clamping catch is in the hold down position being that one of a longer length.

8. An improvement as set forth in claim 1, the thickness of the clamping catch in the region of said fork-like member being no more than about one-half the axial length of said locking bolt.

9. An improvement as set forth in claim 1, said improvement comprising a bushing connected to said compression spring at that end remote from said clamping catch, said bushing having an axis parallel to said transverse axis of said clamping catch, and a positioning lug mountable to said vehicle body, said bushing encircling a bolt fixed to said positioning lug.

10. An improvement as set forth in claim 1, said improvement comprising a bifurcated member fixed to that end of said compression spring remote frm said clamping catch, a bolt having an axis parallel to the transverse axis of said clamping catch, said bifurcated member being pivotally suppoorted on said bolt, and a positioning lug attachable to said vehicle body, said bolt being mounted on said positioning lug.

11. An improvement as set forth in claim 1, said improvement comprising a phantom plane that includes the transverse axis of said clamping catch and the pivot axis where the end of said compression spring remote from said clamping catch is pivotally connectable to said vehicle body, that pivot attachment where said compression spring is attached to said clamping catch lying on one side of said plane when said clamping catch is in said relase position and on the other side of said plane when the clamping catch is in said hold down position.

* * * * *